United States Patent
Kim

(10) Patent No.: US 10,801,470 B2
(45) Date of Patent: Oct. 13, 2020

(54) APPARATUS AND METHOD FOR CONTROLLING WIND POWER GENERATOR UNIT

(71) Applicant: DOOSAN HEAVY INDUSTRIES CONSTRUCTION CO., LTD., Gyeongsangnam-do (KR)

(72) Inventor: Kyung-Taek Kim, Daejeon (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 958 days.

(21) Appl. No.: 15/350,807

(22) Filed: Nov. 14, 2016

(65) Prior Publication Data
US 2017/0138347 A1    May 18, 2017

(30) Foreign Application Priority Data
Nov. 12, 2015 (KR) .................. 10-2015-0159142

(51) Int. Cl.
*F03D 7/02* (2006.01)

(52) U.S. Cl.
CPC ......... *F03D 7/0204* (2013.01); *F03D 7/0248* (2013.01); *F05B 2270/20* (2013.01); *F05B 2270/3032* (2013.01); *F05B 2270/321* (2013.01); *Y02E 10/723* (2013.01)

(58) Field of Classification Search
CPC ............... F03D 7/0204; F03D 7/0248; F05B 2270/321; F05B 2270/3032; F05B 2270/20; Y02E 10/723
See application file for complete search history.

(56) References Cited

U.S. PATENT DOCUMENTS

| 8,177,510 B2 * | 5/2012 | Nies ............... F03D 7/0204 416/169 R |
| 2010/0138060 A1 | 6/2010 | Gao et al. |
| 2010/0209246 A1 * | 8/2010 | Migliori ........... F03D 7/0204 416/1 |
| 2011/0057451 A1 * | 3/2011 | Volmer ............. F03D 80/70 290/55 |
| 2011/0309620 A1 | 12/2011 | Fujino et al. |
| 2013/0099494 A1 * | 4/2013 | Numajiri ........... F03D 7/0212 290/44 |

FOREIGN PATENT DOCUMENTS

EP    2713047 A2    4/2014

OTHER PUBLICATIONS

European Search Report dated Mar. 17, 2017 in European Application No. 16198157.6.

* cited by examiner

Primary Examiner — David E Sosnowski
Assistant Examiner — Danielle M. Christensen
(74) Attorney, Agent, or Firm — Invenstone Patent, LLC

(57) ABSTRACT

An apparatus for controlling a wind power generator unit includes a deviation detection unit to detect an angular deviation between windward and a current rotation direction of a nacelle after a wind power generator is installed so as to face the windward, and a control unit to receive data detected by the deviation detection unit and to control a brake state and a yawing state of a yaw brake unit, wherein when the nacelle rotates out of a preset deviation range, the control unit temporarily releases frictional force of a brake pad coming into close contact with a disk so as to control a brake operation state of the yaw brake unit.

14 Claims, 8 Drawing Sheets

APPARATUS AND METHOD FOR CONTROLLING WIND POWER GENERATOR UNIT

CROSS-REFERENCE TO RELATED APPLICATIONS

This application claims priority under 35 U.S.C. § 119 to Korean Patent Application No. 10-2015-0159142, filed Nov. 12, 2015, which is herein incorporated by reference in its entirety.

BACKGROUND OF THE INVENTION

Field of the Invention

Exemplary embodiments of the present invention relate to an apparatus and method for controlling a wind power generator unit, which are capable of minimizing the frequency of operation of a yaw brake unit included in a wind power generator, and more particularly, to an apparatus and method for controlling a wind power generator unit, which are capable of reducing the occurrence of vibration and noise by selectively controlling the on or off state of a brake according to an unnecessary yawing direction.

Description of the Related Art

In general, wind power generation is a technology that converts the kinetic energy of wind into electric energy after conversion into mechanical energy. This technology is increasingly used since it costs little to use as an energy source and is environmentally-friendly.

A wind power generator includes a tower which is stood on the ground; a nacelle that is mounted to an upper end of the tower so as to rotate (yaw) and includes a speed increaser, a generator, and a controller therein; and a rotor which is mounted to a rotary shaft of the generator. The rotor includes a plurality of blades. When wind acts on the blades and the rotor rotates, the generator is driven through the rotary shaft to produce electricity.

Meanwhile, the wind power generator is installed on the bare ground, and includes a yawing system as a nacelle direction adjustment apparatus, which rotates the nacelle in a windward direction in order to secure safety such that the wind power generator is not damaged when it is exposed to strong wind and to maximize power production using the kinetic energy of wind to the maximum.

The yawing system rotates the nacelle relative to the tower using a motor drive device referred to as a yaw driver. The yawing system includes a friction device in order to inhibit the yaw driver from being damaged due to an overload applied thereto by inertial force when the nacelle does not rotate at a proper speed.

The friction device is configured so as to adjust the yawing velocity of the nacelle by attaching a friction material to a plate, which is elastically supported by a spring, and rubbing the friction material against a fixed side. The friction device may adjust the magnitude of frictional force by adjusting the degree of compression of the spring using an adjustable nut.

Meanwhile, the friction device comprises a plurality of friction devices as occasion demands. However, since the frictional force of each friction device is adjusted by using the adjustable nut, it is difficult to uniformly generate frictional force by each friction device and to appropriately control the frictional force, resulting in deterioration of capability to reduce a yawing load. In addition, since the elasticity of the spring is changed over time, it is impossible to keep the frictional force required at the time of initial design.

In addition, since a brake is always maintained in an on state, when the nacelle rotates to the left or the right, vibration and noise are increased together with an unnecessary increase in driving force due to the brake, and an asymmetric phenomenon of driving force occurs according to the rotation direction of the nacelle.

BRIEF SUMMARY

An object of the present invention is to provide an apparatus and method for controlling a wind power generator unit, which are capable of selectively controlling the on or off state of a brake when a nacelle included in a wind power generator yaws in a specific direction.

Other advantages of the present invention can be understood by the following description, and become apparent with reference to the embodiments of the present invention. Also, it is obvious to those skilled in the art to which the present invention pertains that the advantages of the present invention can be realized by the means as claimed and combinations thereof.

In accordance with one aspect of the present invention, an apparatus for controlling a wind power generator unit includes a deviation detection unit to detect an angular deviation between windward and a current rotation direction of a nacelle after a wind power generator is installed so as to face the windward, and a control unit to receive data detected by the deviation detection unit and to control a brake state and a yawing state of a yaw brake unit, wherein when the nacelle rotates out of a preset deviation range, the control unit temporarily releases frictional force of a brake pad coming into close contact with a disk so as to control a brake operation state of the yaw brake unit.

In the control unit, when a blade provided in the wind power generator is rotated clockwise, the angular deviation between aerodynamic force and the rotation direction of the nacelle may be set based on when the nacelle rotates in a left direction, and when the blade is rotated counterclockwise, the angular deviation between the aerodynamic force and the rotation direction of the nacelle may be set based on when the nacelle rotates in a right direction.

The yaw brake unit may comprise a plurality of yaw brake units arranged in a circumferential direction of a yaw bearing, and the control unit may simultaneously control the yaw brake units.

When the nacelle is out of the preset deviation range, the control unit may control yawing of the nacelle such that the nacelle is located in the windward direction.

The control unit may control yawing of the nacelle at a constant speed such that the nacelle is located within the deviation range.

The control unit may first control yawing of the nacelle at a first speed such that the nacelle is located within the deviation range, and when the nacelle is located within the deviation range, the control unit may control the yawing of the nacelle at a second speed lower than the first speed until the yawing of the nacelle coincides with aerodynamic force.

The nacelle may include resisters provided in a plurality of yaw drive units, and overheating states of the resisters may be detected by a resister state detection unit.

When at least one of the resisters provided in the yaw drive units is overheated, the control unit may control the yaw brake unit such that the disk comes into close contact with the brake pad, and when the resister is maintained in a non-heated state, the control unit may cause the frictional force of the brake pad to be released.

When the resister is in the non-heated state, the control unit may change the brake state of the yaw brake unit to an off state.

In accordance with another aspect of the present invention, a method of controlling a wind power generator unit comprises detecting a deviation according to a current position of a nacelle of a wind power generator relative to windward, when the nacelle yaws in a state in which the nacelle is installed so as to face the windward; selectively controlling an on or off state of a yaw brake unit according to a yawing direction of the nacelle when the deviation between the current position of the nacelle and aerodynamic force is out of a preset deviation range; and controlling the yawing of the nacelle such that the nacelle yaws within the deviation range.

The selectively controlling an on or off state of a yaw brake unit may include changing the brake state of the yaw brake unit to an off state when the nacelle is out of the deviation range.

The controlling the yawing of the nacelle may include rotating the nacelle at a constant speed such that the nacelle is located within the deviation range.

The controlling the yawing of the nacelle may include rotating the nacelle such that the nacelle is located within the deviation range and rotating the nacelle such that the nacelle is located within the deviation range by increasing a speed of the nacelle according to a position of the nacelle relative to the aerodynamic force, and rotating the nacelle at a constant speed when the nacelle is located within the deviation range.

The selectively controlling an on or off state of a yaw brake unit may further include determining whether resisters provided in a plurality of yaw drive units are overheated.

It is to be understood that both the foregoing general description and the following detailed description of the present invention are exemplary and explanatory and are intended to provide further explanation of the invention as claimed.

BRIEF DESCRIPTION OF THE DRAWINGS

The above and other advantages of the present invention will be more clearly understood from the following detailed description taken in conjunction with the accompanying drawings, in which.

DETAILED DESCRIPTION

Figure 1:
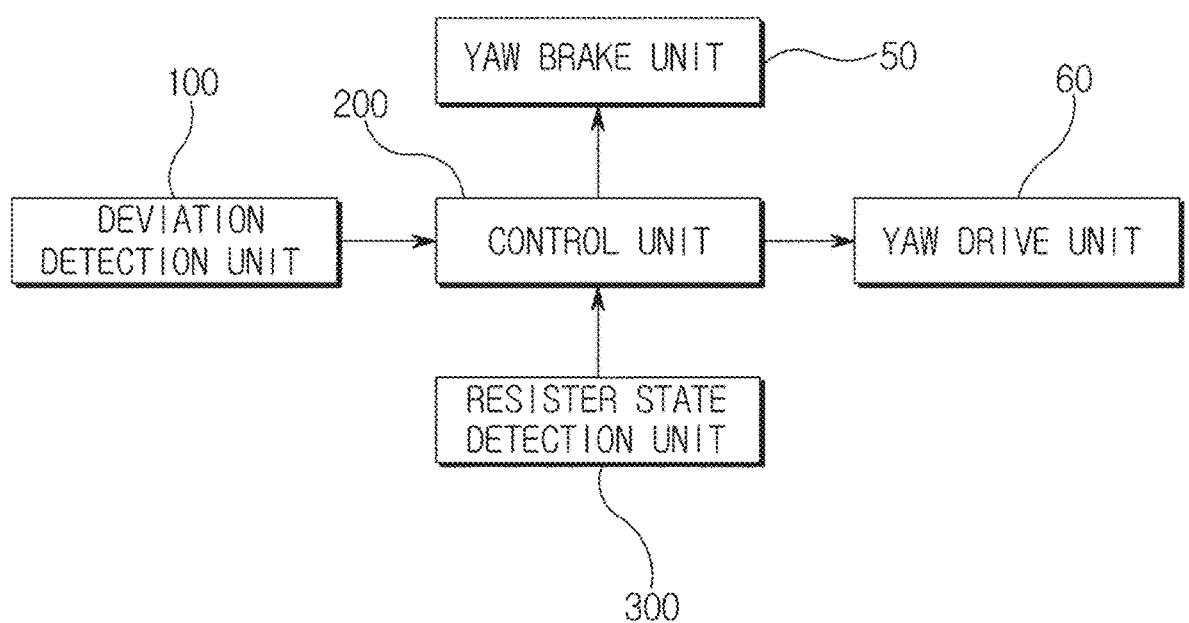
FIG. 1 is a block diagram illustrating the configuration of an apparatus for controlling a wind power generator unit according to an embodiment of the present invention.
Figure 2:
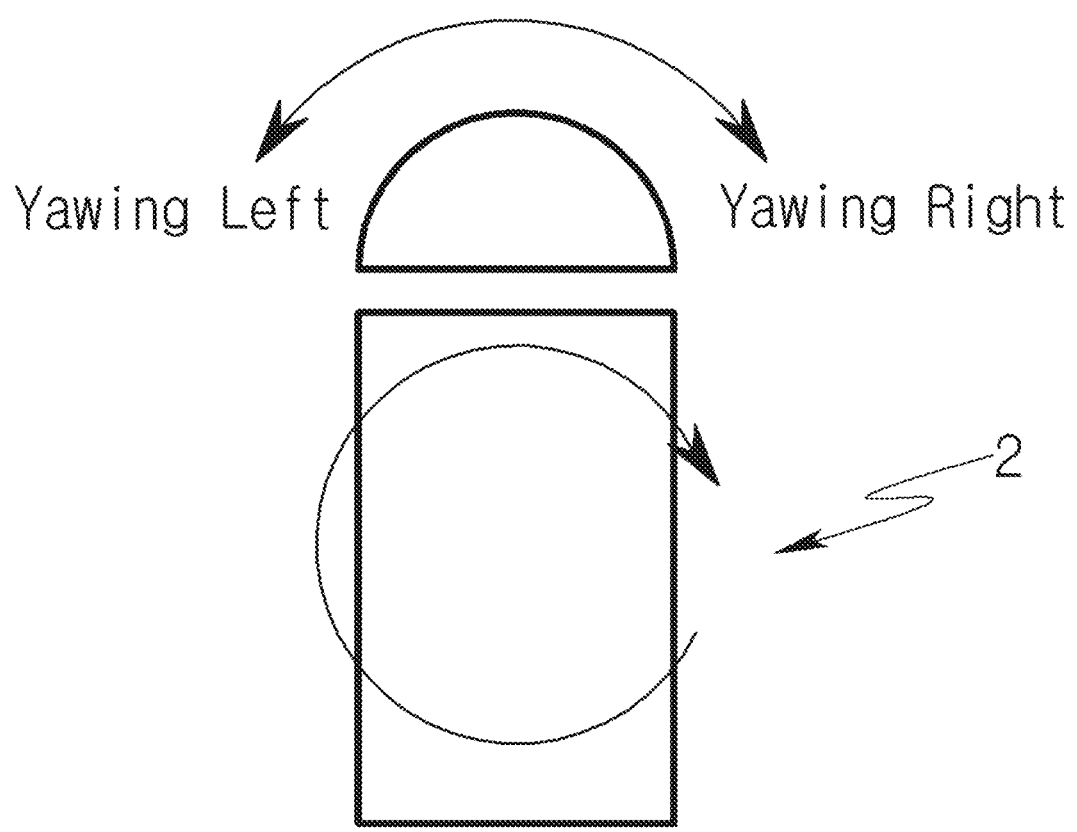
FIG. 2 is a top view illustrating a nacelle.
Figure 3:
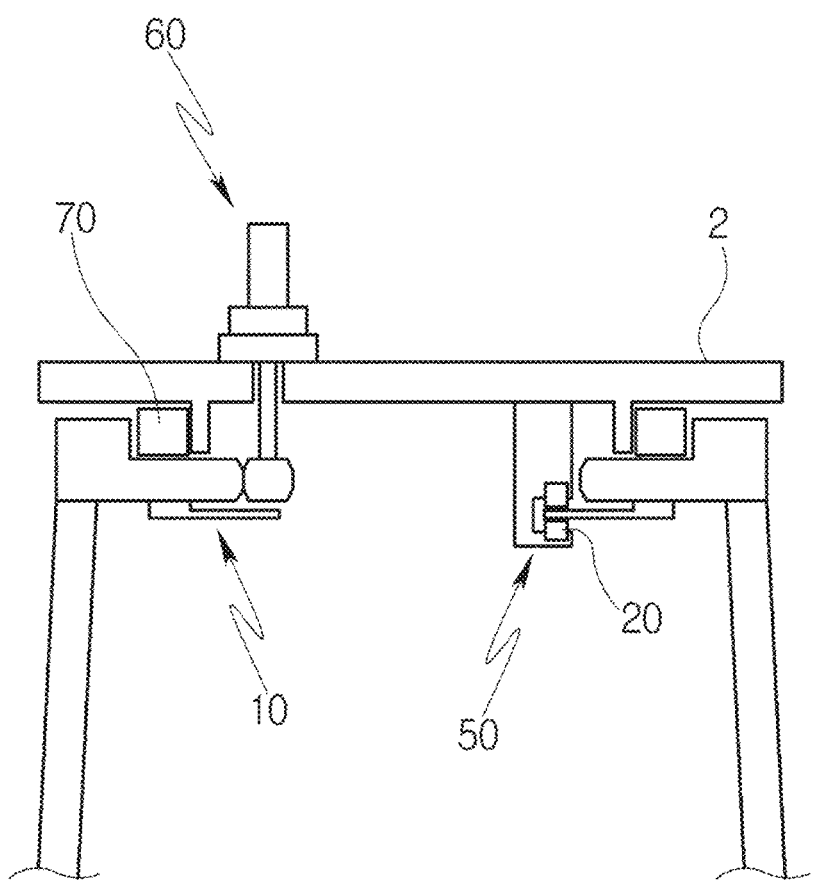
FIG. 3 is a side view schematically illustrating the main components of a wind power generator according to the embodiment of the present invention.

Hereinafter, the configuration of a wind power generator unit according to an embodiment of the present invention will be described in detail with reference to the accompanying drawings. FIG. 1 is a block diagram illustrating the configuration of an apparatus for controlling a wind power generator unit according to an embodiment of the present invention. FIG. 2 is a top view illustrating a nacelle. FIG. 3 is a side view schematically illustrating the main components of a wind power generator according to the subject embodiment of the present invention.

Referring to FIGS. 1 to 3, the wind power generator unit according to the subject embodiment of the present invention controls an operation state in order to minimize the occurrence of vibration and noise according to the yawing of a nacelle. In particular, the wind power generator unit reduces the occurrence of vibration and noise by minimizing an asymmetric phenomenon of driving force occurring at left and right positions while the nacelle yaws in a left or right direction, and accomplishes stable power generation and operation by installing a wind power generator in a windward direction.

To this end, the wind power generator unit according to the subject embodiment of the present invention includes a deviation detection unit 100 which detects an angular deviation between windward and a current rotation direction of a nacelle 2 after a wind power generator is installed so as to face the windward, and a control unit 200 which receives data detected by the deviation detection unit 100 and controls a brake state and a yawing state of a yaw brake unit 50.

In addition, when the nacelle 2 rotates out of a preset deviation range, the control unit 200 temporarily releases the frictional force of a brake pad 20 coming into close contact with a disk 10 so as to control the brake operation state of the yaw brake unit 50.

The wind power generator includes a tower (not shown) that is stood on the ground or sea and is a vertical structure, a nacelle (not shown) that is installed at the upper end of the tower, and a blade that is installed at the front of the nacelle to be rotated by wind.

The nacelle includes a variety of components therein for power generation according to the rotation of the blade. By way of example, a speed increaser or a yaw drive unit is provided adjacent to the installation position of the blade, and a generator and a control cabinet are installed adjacent to the speed increaser or the yaw drive unit. A variety of components such as a converter and a transformer are mounted to the nacelle.

The nacelle 2 has various sizes and weights depending on the capacity of the wind power generator, and the wind power generator is initially installed in a region in which a large amount of wind is blowing.

The wind power generator is located so as to face windward in the region. Particularly, since the blade and the nacelle extend rectilinearly, the wind power generator is installed in the windward direction to stably generate electric power, and yaws in a left or right direction according to the rotation direction of the nacelle 2.

When the wind power generator is normally operated, power generation is stably performed according to the rotation of the blade since the nacelle faces the windward. If the nacelle does not face the windward, but is excessively rotated in one direction of the left and right directions, the position of the nacelle must be changed through the yawing control thereof.

Since the wind power generator is installed on a shoreline or a slope, or on the sea, where a large amount of wind is blowing, it is difficult for an operator to stand by or reside in the vicinity of the wind power generator. Therefore, the yawing of the nacelle 2 is controlled by controlling the on or off state of the brake of the yaw brake unit 50, and a detailed description thereof will be given below.

The deviation detection unit 100 sets an angular deviation which is limited within a specific angle in the left or right direction of the nacelle 2 in the state in which the wind power generator is initially installed such that the nacelle 2 faces the windward. Since the angular deviation varies according to the size and generation quantity of the wind power generator, it is not numerically limited and varies according to its manufacturer. However, the angular deviation is set to be a specific angle in consideration of the nacelle 2 and the windward.

The deviation detection unit 100 detects a yawing angle according to movement to the left or the right according to the yawing of the nacelle 2, and transmits the detected angle to the control unit 200.

In the control unit 200, when the blade (not shown) included in the wind power generator is rotated clockwise, the angular deviation between the aerodynamic force and the rotation direction of the nacelle 2 is set based on when the nacelle 2 rotates to the left. When the blade is rotated counterclockwise, the angular deviation between the aerodynamic force and the rotation direction of the nacelle 2 is set based on when the nacelle 2 rotates to the right. For reference, the present embodiment will be described based on when the nacelle 2 rotates to the left.

For reference, the aerodynamic force is a wind load and means air resistance acting on a rotor. The aerodynamic force means external force obtained by converting the aerodynamic force into components acting on one brake unit.

The yaw brake unit 50 and the yaw drive unit 60 are included in the nacelle 2. The yaw brake unit 50 is provided for an operation state related to the brake according to the yawing of the nacelle 2. The yaw drive unit 60 is configured by the combination of a yaw drive motor and a power transfer component (not shown) and is provided for yawing through relative rotation with a yaw bearing 70 that is circumferentially provided in the nacelle 2.

The yaw brake unit 50 comprises a plurality of yaw brake units arranged in the circumferential direction of the yaw bearing. The control unit 200 simultaneously controls these yaw brake units 50. Through such control, when a yaw brake unit located at a specific position is controlled in an on state and another yaw brake unit is controlled in an off state, it is possible to inhibit a load from concentrating on the yaw brake unit, which is in the on state, and thus to inhibit vibration and noise from increasing.

Accordingly, the control unit 200 controls the yaw brake units 50 such that all of them are in an on or off state, and controls the yawing of the nacelle 2.

Electric power is preferably generated according to the rotation of the blade when the nacelle 2 faces the initial windward after the wind power generator is installed. However, aerodynamic force may be irregularly changed due to weather change and climate change.

For example, when wind blew directly toward the nacelle 2 an hour ago and later is blowing to the left or right of the nacelle 2, the nacelle 2 may be moved to a position out of a preset deviation range.

The deviation detection unit 100 detects an angle according to the current position of the nacelle 2 and transmits it to the control unit 200, and the control unit 200 calculates whether the current position of the nacelle 2 is within a deviation range.

Figure 4:
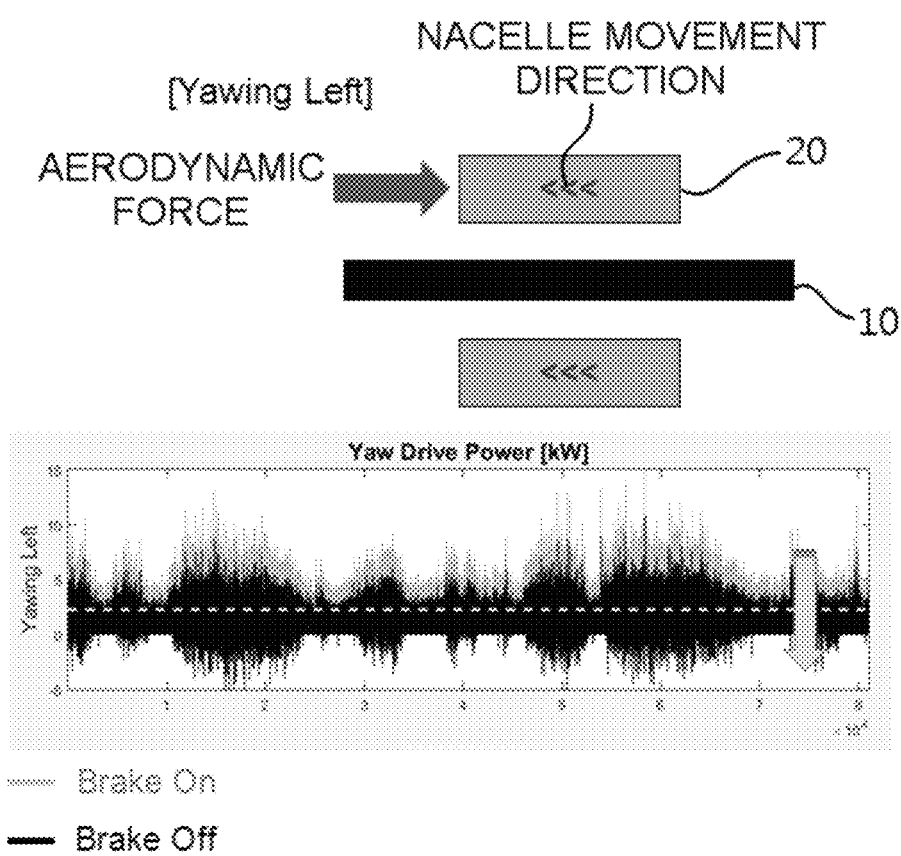
FIGS. 4 and 5 are views schematically illustrating a yawing state according to the embodiment of the present invention.
Figure 5:
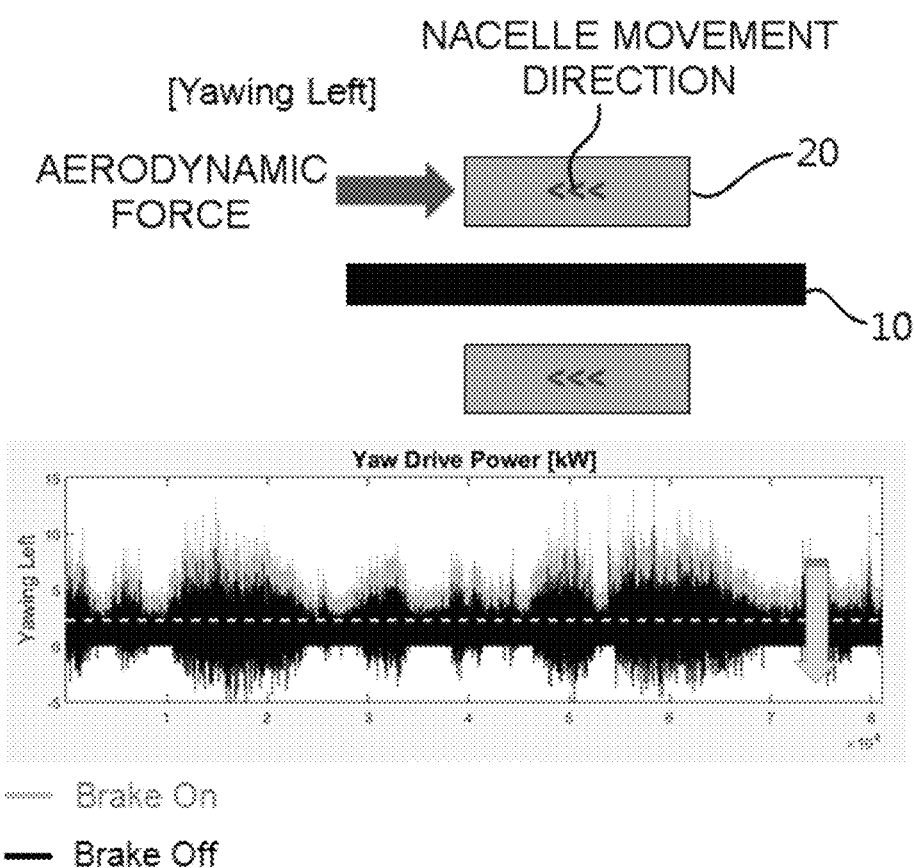

Referring to FIGS. 4 and 5, when the nacelle 2 is deviated from the deviation range and yaws to the left, the yawing of the nacelle 2 is controlled such that the nacelle 2 is located in a windward direction. The control unit 200 separates the brake pad 20 included in the yaw brake unit 50 from the disk 10 so that the brake pad 20 and the disk 10 are maintained in a non-friction state.

For reference, the symbol "<<<" in the drawings refers to the movement direction of the nacelle. In the subject embodiment, the nacelle moves from the right to the left, and the aerodynamic force is indicated by the bold arrow directed from the left to the right in the drawings.

The state illustrated in the drawing is a state in which braking is not performed by the yaw brake unit 50. Therefore, the power consumption (kW) corresponding to the power of the yaw brake unit 50 according to e is relatively reduced, as illustrated by heavy black at a position indicated by light gray.

Accordingly, when the brake state of the yaw brake unit 50 is changed to an off state, the brake pad 20 does not come into close contact with the disk 10. Thus, the vibration and noise of the nacelle 2 are reduced, the driving force of the yaw drive unit 60 is reduced, power consumption is further reduced, and the output of the wind power generator is ultimately increased.

When the nacelle 2 is moved to the left, the control unit 200 controls the yawing of the nacelle 2 at a constant speed such that the nacelle 2 is located within the deviation range. For example, the control unit 200 first controls the yawing of the nacelle 2 at a first speed, and when the nacelle 2 is located within the deviation range, the control unit 200 controls the yawing of the nacelle 2 at a second speed lower than the first speed until the yawing of the nacelle coincides with aerodynamic force.

Here, the first and second speeds are not especially limited, and vary according to the output of the wind power generator and wind power data in the place where the wind power generator is installed.

The yaw drive unit 60 may comprise a plurality of yaw drive units. When the control unit 200 controls the yawing of the nacelle 2 at a constant speed, the control unit 200 allows each of the yaw drive motors included in these yaw drive units 60 to be operated at a constant speed. Therefore, the nacelle 2, which is a heavy body, may stably yaw.

The case where the yawing of the nacelle 2 is controlled at a constant speed corresponds to a case where the nacelle 2 is rotated to the left by a predetermined angle in the preset angular deviation.

When the control unit 200 determines that the nacelle 2 is excessively rotated to the left and an angular deviation is significantly increased, the control unit 200 controls the yawing of the nacelle 2 at a first speed in order for the nacelle 2 to yaw to a normal position. The first speed is not especially limited to a specific speed. The yawing of the nacelle 2 is controlled at a speed higher than the second speed to be described later.

When the nacelle 2 is determined to be located close to the deviation range by the deviation detection unit 100, the control unit 200 controls the yaw drive unit 60 such that yawing velocity is lowered to a second speed and ultimately controls the yawing of the nacelle 2 at a constant speed until the yawing of the nacelle coincides with aerodynamic force.

In this case, the nacelle 2 may rapidly yaw to a normal position in the state in which it is excessively moved to the left. Therefore the occurrence of vibration and noise and the driving force of the yaw drive unit 60 are reduced. In addition, power consumption is reduced, and the output of the wind power generator is ultimately increased.

When the nacelle 2 is rotated to the right, frictional force is applied in the direction opposite to aerodynamic force in the state in which the brake pad 20 included in the yaw brake unit 50 comes into close contact with the disk 10, in which case the friction between the brake pad 20 and the disk 10 is maintained. In this case, the power consumption corresponding to the power of the yaw drive unit 60 is generated as illustrated by heavy black, compared to the case of FIG. 4.

In the subject embodiment, resisters are provided in a plurality of yaw drive units 60, and the overheating state of each of the resisters is detected by a resister state detection unit 300.

When the yaw drive unit 60 is normally operated, the resister is not overheated. However, when the yaw drive motor included in the yaw drive unit 60 is operated as a generator, the resister is overheated.

In this case, the nacelle 2 may not yaw normally due to a malfunction or failure of the yaw drive unit 60. Therefore, the resister state detection unit 300 is a very important component in order to stably protect the yaw drive unit 60 and normally operate the wind power generator through the normal yawing of the nacelle 2.

When at least one of the resisters included in a plurality of yaw drive units 60 is overheated, the control unit 200 controls the yaw brake unit 50 such that the disk 10 comes into close contact with the brake pad 20. When the resister is maintained in a non-heated state, the control unit 200 allows the frictional force of the brake pad 20 to be released.

In this case, since the overheating of the resister is stopped, it is possible to inhibit the failure and damage of the yaw drive unit 60 and to uniformly maintain the generating efficiency of the wind power generator.

When the resister is in a non-heated state, the control unit 200 causes the brake of the yaw brake unit 50 to be in an off state and controls the yawing of the nacelle 2.

Accordingly, it is possible to minimize the occurrence of noise and vibration due to the braking of the yaw brake unit 50.

Hereinafter, a method of controlling a wind power generator unit according to an embodiment of the present invention will be described with reference to the accompanying drawings.

Figure 6:
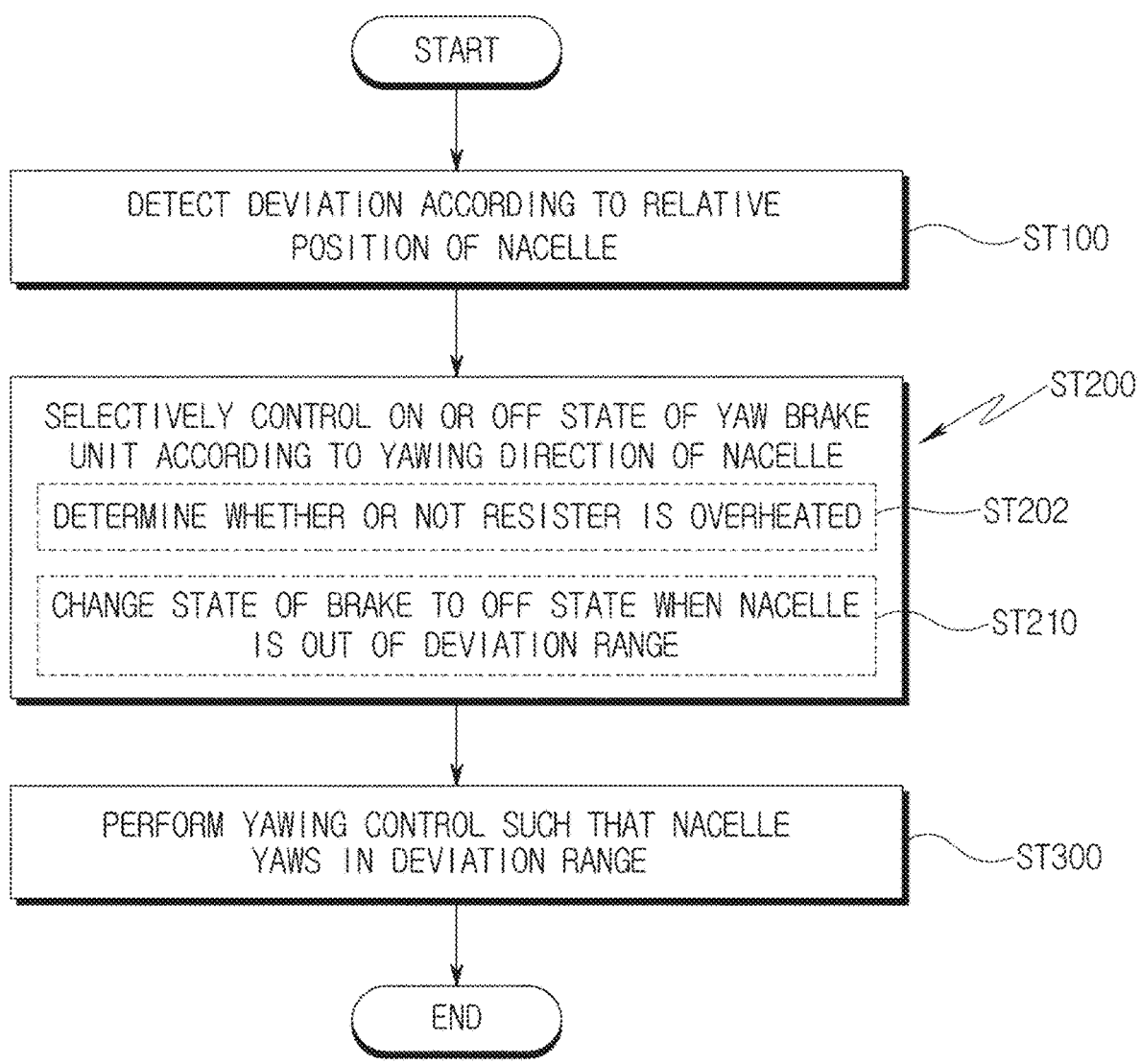
FIG. 6 is a flowchart illustrating a method of controlling a wind power generator unit according to an embodiment of the present invention.
Figure 7:
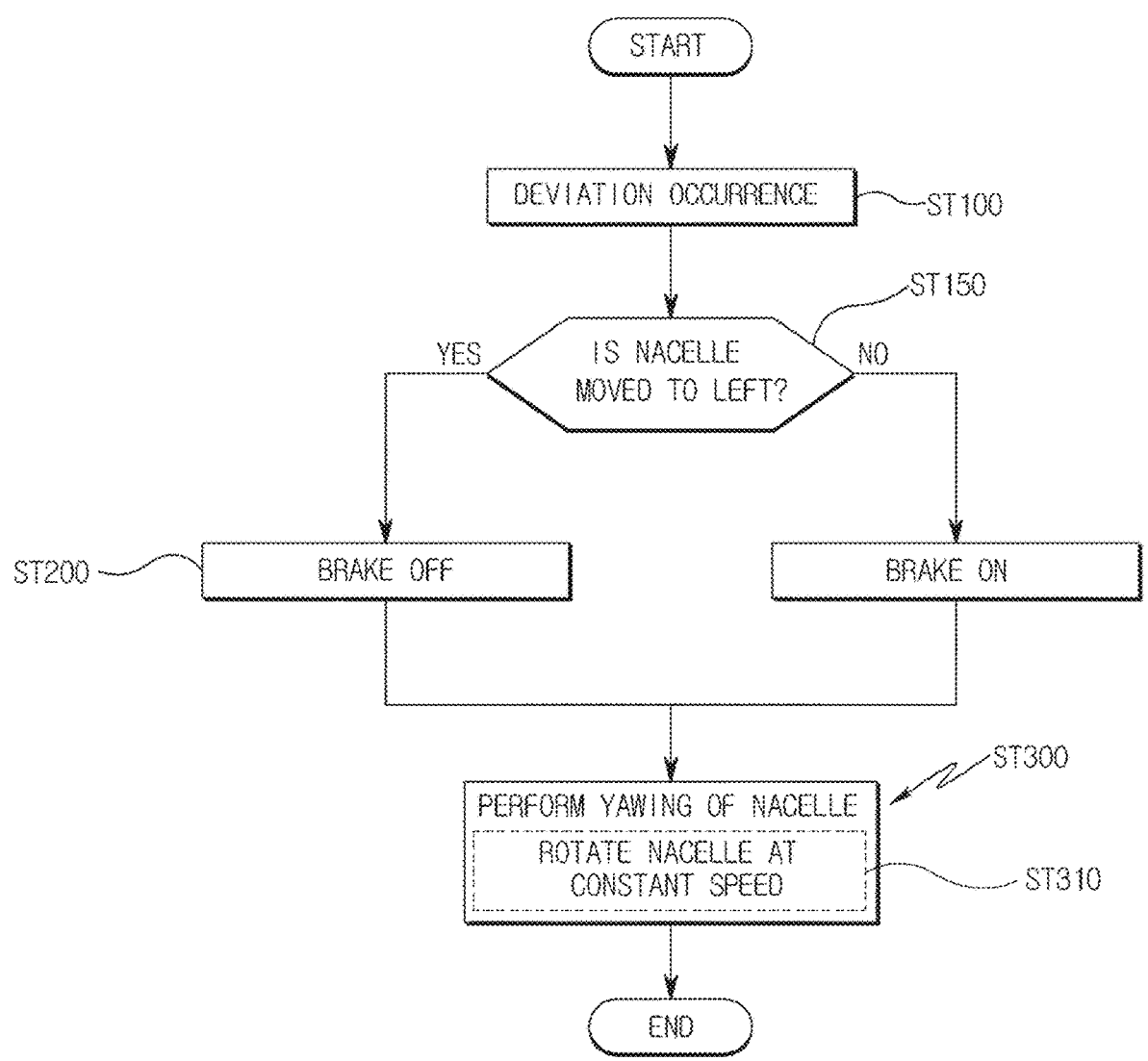
FIGS. 7 and 8 are flowcharts illustrating the method of controlling a wind power generator unit according to the embodiment of the present invention.
Figure 8:
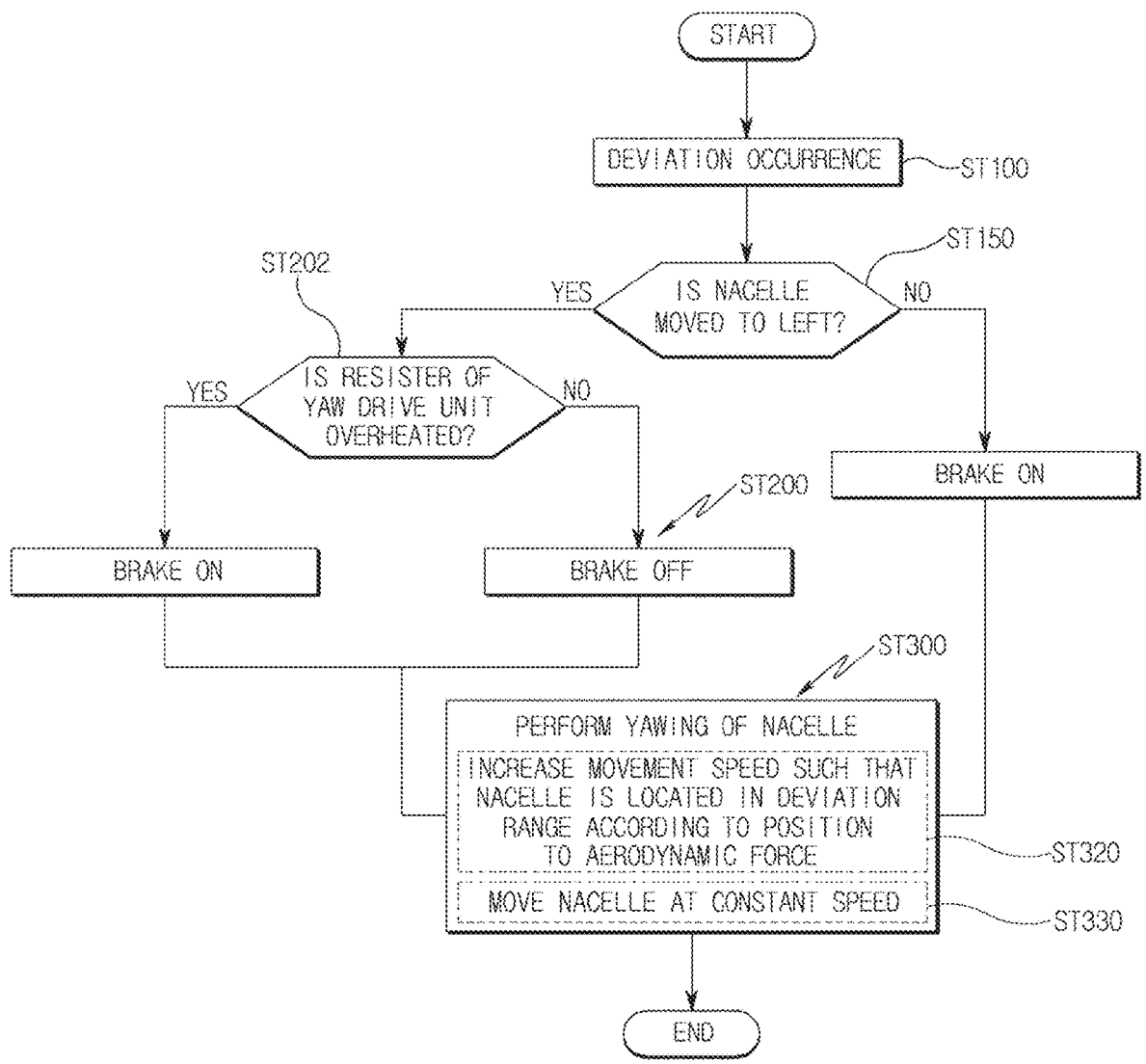

Referring to FIGS. 6 to 8, the method includes a step (ST100) of, when a nacelle of a wind power generator yaws in the state in which the nacelle is installed so as to face windward, detecting a deviation according to the current position of the nacelle relative to the windward, a step (ST200) of selectively controlling the on or off state of a yaw brake unit according to the yawing direction of the nacelle when the deviation between the current position of the nacelle and aerodynamic force is out of a preset deviation range, and a step (ST300) of controlling the yawing of the nacelle such that the nacelle yaws within the deviation range.

In the step (ST100), the deviation according to the current position of the nacelle relative to the windward is detected by the above-mentioned deviation detection unit. In the subject embodiment, this is limited to the case where the nacelle is rotated to the left, in which case the wind power generator generates electric power along with the clockwise rotation of a blade.

The deviation according to the current position of the nacelle relative to the windward varies according to a single wind power generation and a plurality of wind power generators. For example, in a plurality of wind power generators, angular deviations relative to the respective wind power generators are detected so that deviations according to the current positions of nacelles are detected.

In the step (ST200), a first control step (ST210) of causing the brake of the yaw brake unit to be in an off state when the nacelle is out of the deviation range is performed.

In the first control step (ST210), since the brake state of the yaw brake unit is released, the occurrence of noise and vibration due to braking is minimized or inhibited. Therefore, it is possible to minimize the frequency of operation of the yaw brake unit. For reference, when the nacelle is rotated to the right, the brake of the yaw brake unit is operated.

Referring to FIG. 8, when a deviation occurs in the nacelle (ST100), the control unit determines whether the nacelle is moved to the left (ST150). If the nacelle is rotated to the right, the brake is maintained in an on state.

When the nacelle is rotated to the left, the on or off state of the yaw brake unit is selectively controlled (ST200). The control unit determines whether a resister included in a yaw drive unit is overheated before the yaw brake unit is controlled (ST202), and accurately checks the state of the resister. By way of example, when the nacelle yaws, the resister included in the yaw drive unit is overheated when a yaw drive motor is operated as a generator.

In this case, the nacelle may not yaw normally due to the failure of the yaw drive unit. Therefore, the yaw drive unit is stably protected so as to inhibit excessive driving force from occurring in the yaw drive unit located at a specific position, and thus the wind power generator may stably generate electric power.

When the resister is determined to be overheated, the state of the brake is changed to an on state, and the yawing of the nacelle is controlled (ST300). In the step (ST300), a first yawing control step (ST310) of rotating the nacelle at a constant speed such that the nacelle is located within a deviation range, as illustrated in FIG. 8, is performed. In this case, it is possible to drive the yaw drive unit until the nacelle is located within the deviation range and to control the yawing of the nacelle.

Unlike this, in the step (ST300), the control unit rotates the nacelle such that the nacelle is located within the deviation range. In the step, after a second yawing control step (ST320) of rotating the nacelle such that the nacelle is located within the deviation range by increasing the speed of the nacelle according to the position of the nacelle relative to aerodynamic force is first performed, a third yawing control step (ST330) of rotating the nacelle at a constant speed when the nacelle is located within the deviation range is performed.

This case corresponds to a case where the nacelle rapidly yaws to a normal position in the state in which the nacelle is excessively located to the left. For example, the above-mentioned method is performed for the stable yawing of the nacelle in the event of strong wind or gust due to rapid change in weather. Thus, the wind power generator may stably generate electric power regardless of deterioration of weather in the place where the wind power generator is installed.

As is apparent from the above description, in accordance with exemplary embodiments of the present invention, it is possible to improve the generating efficiency of a wind power generator and reduce electric energy consumed while a yaw drive unit is operated, by minimizing an asymmetric phenomenon of driving force occurring when a nacelle included in the wind power generator yaws in a specific direction.

In addition, it is possible to reduce the occurrence of vibration and noise by minimizing the frequency of operation of a brake of a yaw brake unit according to the yawing of the nacelle.

While the present invention has been described with respect to the specific embodiments, it will be apparent to those skilled in the art that various changes and modifications may be made without departing from the spirit and scope of the invention as defined in the following claims.

What is claimed is:

1. An apparatus for controlling a wind power generator installed so as to face in a windward direction, the apparatus comprising:
  a plurality of yaw drivers, each of the plurality of yaw drivers including a resistor;
  a nacelle having a current rotation direction determined by an operation of the plurality of yaw drivers and an operation of a yaw brake including a brake pad configured to come into close contact with a disk; and
  a controller configured to
    receive data indicative of an angular deviation between the windward direction and the current rotation direction of the nacelle, and
    control a brake state and a yawing state of the yaw brake,
  wherein, when the nacelle rotates outside a preset deviation range, the controller is further configured to
    control the brake state of the yaw brake by temporarily releasing frictional force of the brake pad,
    control yawing of the nacelle by one of a first speed and a second speed lower than the first speed, and
    determine whether at least one of the resistors provided in the plurality of yaw drivers are overheated in order to selectively control an on or off state of the yaw brake according to a yawing direction of the nacelle.

2. The apparatus according to claim 1,
  wherein the nacelle includes at least one blade installed at a front of the nacelle to be rotated by wind, and
  wherein the controller is further configured to
    set an angular deviation between aerodynamic force and the current rotation direction of the nacelle based on the nacelle yawing in a left direction, when the at least one blade rotates clockwise, and
    set the angular deviation between aerodynamic force and the current rotation direction of the nacelle based on the nacelle yawing in a right direction, when the at least one blade rotates counterclockwise.

3. The apparatus according to claim 1,
  wherein the yaw brake comprises a plurality of yaw brakes arranged in a circumferential direction of a yaw bearing, and
  wherein the controller is further configured to simultaneously control the plurality of yaw brakes.

4. The apparatus according to claim 3, wherein the controller is further configured to control the plurality of yaw brakes such that all of the yaw brakes are in an on or off state.

5. The apparatus according to claim 1, wherein, when the nacelle is outside the preset deviation range, the controller is further configured to control yawing of the nacelle such that the nacelle is located in the windward direction.

6. The apparatus according to claim 1, wherein the controller is further configured to control yawing of the nacelle at a constant speed such that the nacelle is located within the preset deviation range.

7. The apparatus according to claim 1,
  wherein, when the nacelle is outside the preset deviation range, the controller is further configured to control yawing of the nacelle at the first speed such that the nacelle is located within the preset deviation range, and
  wherein, when the nacelle is located within the preset deviation range, the controller is further configured to control the yawing of the nacelle at the second speed until the yawing of the nacelle coincides with aerodynamic force.

8. The apparatus according to claim 1,
  wherein the nacelle comprises resistors provided in the plurality of yaw drivers, and
  wherein the controller is further configured to receive data indicative of overheating states of the resistors.

9. The apparatus according to claim 8, wherein the controller is further configured to control the yaw brake such that the disk comes into close contact with the brake pad when at least one of the resistors provided in the yaw drivers is overheated and such that the frictional force of the brake pad is released when the at least one resistor is in a non-heated state.

10. The apparatus according to claim 9, wherein the controller is further configured to change the brake state of the yaw brake to an off state when the at least one resistor is in the non-heated state.

11. A method of controlling a wind power generator, comprising:
  detecting a deviation between a current position of a nacelle of the wind power generator and windward, when the nacelle yaws in a state in which the nacelle is installed so as to face the windward;
  selectively controlling an on or off state of a yaw brake according to a yawing direction of the nacelle when the deviation between the current position of the nacelle and the windward is out of a preset deviation range; and
  controlling yawing of the nacelle such that the nacelle yaws within the preset deviation range,
  wherein the selectively controlling the on or off state of the yaw brake comprises determining whether resistors provided in a plurality of yaw drivers are overheated.

12. The method according to claim 11, wherein the selectively controlling the on or off state of the yaw brake comprises changing a brake state of the yaw brake to the off state when the nacelle is out of the preset deviation range.

13. The method according to claim 11, wherein the controlling the yawing of the nacelle comprises rotating the nacelle at a constant speed such that the nacelle is located within the preset deviation range.

14. The method according to claim 11, wherein the controlling the yawing of the nacelle comprises:
  rotating the nacelle such that the nacelle is located within the preset deviation range and rotating the nacelle such that the nacelle is located within the preset deviation range by increasing a speed of the nacelle according to a position of the nacelle relative to the aerodynamic force; and
  rotating the nacelle at a constant speed when the nacelle is located within the preset deviation range.

* * * * *